March 5, 1929.  S. BULLUM  1,704,120
WHEEL
Filed April 11, 1927   2 Sheets-Sheet 1

INVENTOR.
STEVE BULLUM
BY
ATTORNEYS.

March 5, 1929.  S. BULLUM  1,704,120

WHEEL

Filed April 11, 1927    2 Sheets-Sheet 2

INVENTOR.
STEVE BULLUM
BY Blakesley & Brown
ATTORNEYS.

Patented Mar. 5, 1929.

1,704,120

UNITED STATES PATENT OFFICE.

STEVE BULLUM, OF LOS ANGELES, CALIFORNIA.

WHEEL.

Application filed April 11, 1927. Serial No. 182,771.

This invention relates to wheels, and more particularly to that type of wheel adapted by its construction to resist road shocks. The wheel is of that type commonly known as a spring wheel in that there is a resilient connection between the hub of the wheel and the felly.

The object of the invention is the provision of a wheel of the character stated, which is so constructed as to permit perfect lubrication of all working parts. Another object of the invention is the provision of a wheel adapted to absorb shocks and vibrations responsive to road bed unevenness. Another object is the provision of a wheel so constructed as to relieve the car body with which said wheel is associated from sudden shock due to starting or stopping of the vehicle. Another object is the provision of a wheel so constructed as to resist side stresses without impairing any of the spring quality of the wheel.

Other objects include a wheel which is simple of construction, economical of manufacture, and generally superior to rigid wheels.

With the above and other objects in view the invention consists in, the novel and useful provision, formation, construction, association and relative arrangement of parts, members and features all as shown in a certain embodiment in the accompanying drawings described in general and more particularly pointed out in the claims.

Corresponding parts in the several figures are designated by the same reference characters.

Referring now with particularity to the drawings. The improved wheel is designated as an entirety by A, of which $a$ is the hub, $b$ the felly, $c$ spokes and $d$ resilient means cooperating with the said spokes and hub, all of which elements are used in practicing one embodiment of the invention.

Figure 6:
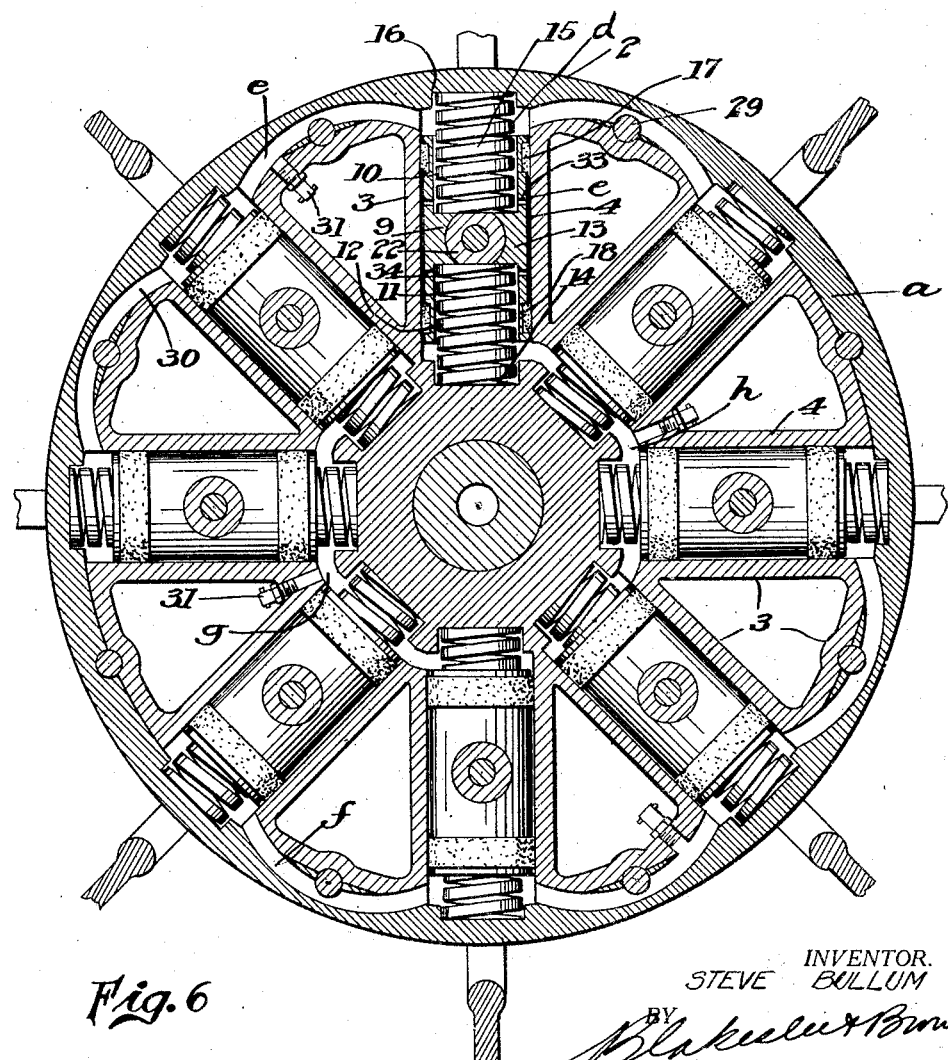

The hub $a$ and the resilient means $d$ is best detailed in Figure 6 to which reference is now directed. The said hub is formed in two sections, 1 and 2, and the section 1 is provided with a series of spaced segmental transverse cut-out portions 3. The part included between each adjacent segmental cut out portion is in the form of a cylinder 4, which is to say the solid portion is provided with a radial bore. The periphery or the rim of said section 1 is tapered as shown in 5 and the section 2 constituting an annular cap is formed with a tapered seat 6 adapted to cooperate with the tapered periphery or rim 5 of the section 1. A pair of diametrically aligned longitudinal slots are provided for each cylinder portion 4 as shown at 7 and 8, and within each cylinder is a piston member 9. The piston member 9 is provided with end sockets 10 and 11. As all of the several cylinders of the said wheel are identical, only one of said cylinders will be described and like reference characters will apply to the others.

Within the socket 11 is confined in part a coil spring 12, one end of which spring bears against a central member 13 of said piston and the opposite end of which spring is socketed at 14 in a portion of the hub. A coil spring 15 is received in the socket 10 and an end of said spring bears against a relieved or socketed portion 16 of the section 2. It will thus be seen that the springs 12 and 15 act to maintain the piston in an intermediate position within the cylinder 4, one spring opposing the other spring. The piston is provided with outer and inner rings 17 and 18 adapted to bear against the inner surface of the cylinder.

Each spoke $c$ is formed in two associated parts 19 and 20, and one end of part 19 is furcated as shown at 21. The furcated portion 21 is adapted to straddle opposite sides of the cylinder 4. A sleeve 22 is passed through a bore in the portion 13 of the piston and extends through the slots 7 and 8 where it is received between enlarged ends of the furcated portion 21. A bolt is passed through bores in the enlarged ends of the furcated part and through the sleeve whereby the several parts are locked together. The part 20 has an enlarged end 23 and provided with a transverse bore. The felly $b$ is provided with a plurality of spaced pairs of inwardly directed lugs 24 and 25, which lugs are provided with aligned transverse bores and through the said bores of the lugs and the heads 23 are passed bolts 26 for securing the parts in working relation. This felly is provided on its periphery with spaced outstanding annular flanges 27 and a tire or tread member 28 is placed upon the felly and between the said flanges. These flanges act as stiffeners for the felly which likewise acts as a rim for the wheel. The sections 1 and 2 are held in cooperative relation by means of bolts 29 which pass transversely through openings in both said members.

A feature of the present invention is the oiling system whereby all moving parts are properly lubricated. There are four oiling systems designated by $e$, $f$, $g$ and $h$. The systems $e$ and $f$ are adapted to lubricate one end of each cylinder and piston, while the oiling systems $g$ and $h$ lubricate the other ends thereof. In particular an oil duct or way 30 is formed in the members 1 and 2, which oil duct or way communicates with adjacent cylinders. The oil duct or way 30 for the system $e$ connects with the outer ends of four of said cylinders, while the system $f$ communicates with the outer ends of four more cylinders. The systems $g$ and $h$ do likewise. In particular the system $g$ permits communication between two of the cylinders at the inner ends thereof that are fed by the system $f$ and two of the cylinders that are fed by the system $e$. The same is true for the system $h$. Oil fittings 31 are in communication with the several oil ducts, so that oil under pressure may be forced into said ducts. The sleeve 22 is provided with an oil duct 32, so that oil may reach the bolt passed therethrough. There are also oil ports or ducts in the skirt portions of the piston as shown at 33 and 34. In this manner oil received in the duct $h$ will likewise pass into the port or duct 32 to lubricate the surface between the bolt and the sleeve and likewise pass through the duct 34 to be received between the periphery of the piston and the wall of the cylinder. This is true likewise for the ports 33 and 32 fed by the oil duct $e$.

In the present embodiment of the invention the wheel acts as a driving member and is provided with a brake drum 35 secured by suitable means 36 to the hub. Said brake drum is provided with radial slots 37 to accommodate the head of the bolts associated with the pistons.

Figure 1:
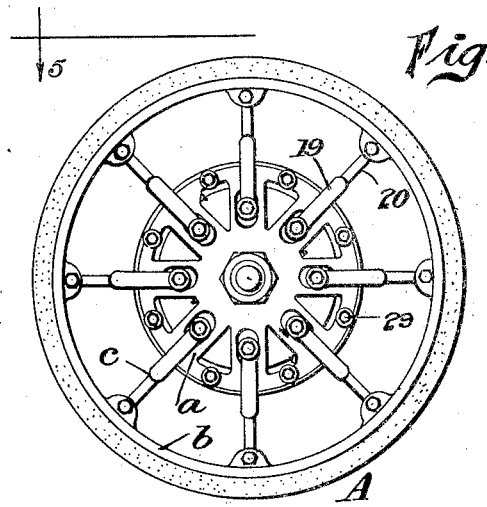
Figure 1 is a side elevation of the wheel.
Figure 2:
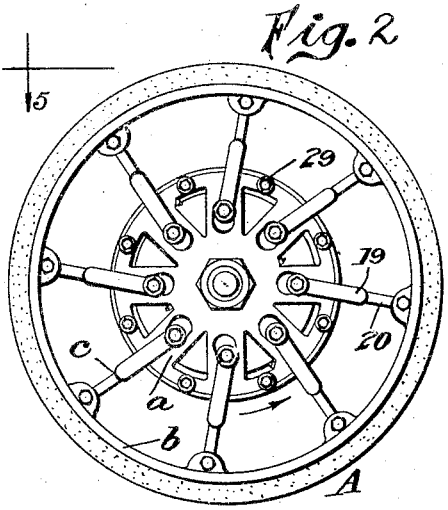
Figure 2 is a view similar to Figure 1, showing the effect of turning the hub relative to the felly.

The operation of the wheel just described is as follows:

In Fig. 1 the wheel is in its normal position. In Figure 2 a turning effort in the direction of the arrow has been exerted upon the hub of the wheel. When this occurs all of the pistons will move outwardly in the cylinders in the hub. This movement, however, is resisted by the springs 15. The shock of moving is therefore relieved by the springs. The same would be true in stopping the vehicle or the wheel movement.

Figure 3:
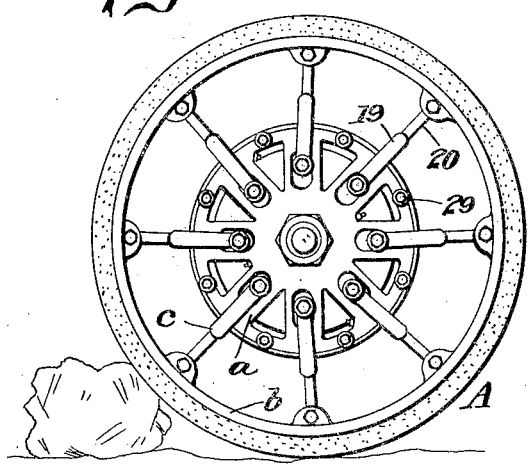
Figure 3 is a side elevation showing the effect produced on the different members of the wheel consequent upon engaging a rock or other unevenness of the road bed.
Figure 4:
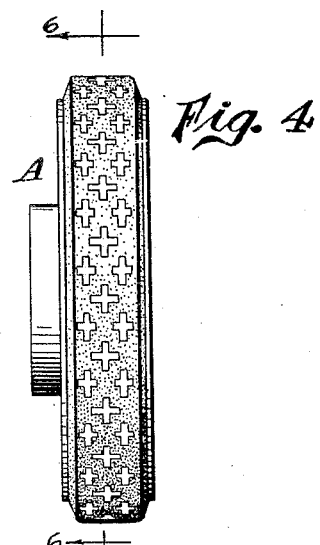
Figure 4 is an end elevation of the wheel.
Figure 5:
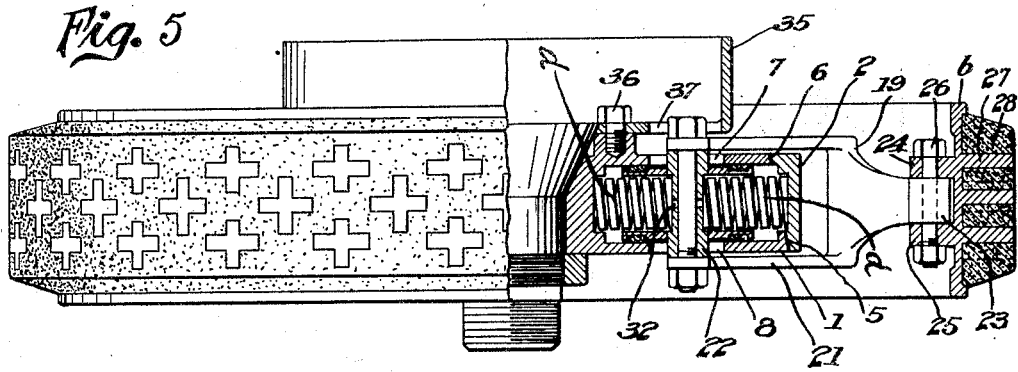
Figure 5 is an enlarged plan view partly in section on the line 5—5 of Figure 1; and, Figure 6 is an enlarged sectional view on the line 6—6 of Figure 4.

In Figure 3 the wheel has contacted with some obstruction and it will be noted that the upper spokes have moved so that the piston is compressing the springs 15 while the lower spokes are compressing the springs 12, all of the spokes moving to a certain extent. The spokes by their construction are allowed movement without twist in the plane of the wheel and the construction of the spokes affords considerable strength to resisting side stresses in the wheel.

It is obvious that various changes, modifications and variations may be made in practicing the invention, in departure from the particular showing of the drawings, without departing from the true spirit of the invention.

Having thus disclosed my invention what I claim and desire to secure by Letters Patent is:

1. In a wheel, a hub formed with cylinders, pistons for said cylinders, resilient means on opposite sides of said pistons, a felly, and spokes pivotally associated with the said felly and with the said pistons.

2. In a wheel, a hub, said hub being formed with a cylinder portion, a piston within said cylinder portion, a bifurcated spoke in part straddling said hub and secured to the said piston, and means for resiliently resisting movement of the piston within the cylinder portion.

3. In a wheel, a hub formed with a plurality of spaced radial cylinder portions, pistons for said cylinder portions, resilient means in said cylinder portions for opposing movement of said pistons, said hub adjacent said cylinder portions being formed with aligned slots, a felly, and spokes provided with bifurcated ends straddling said cylinder portions, and means passed through the slots in the hub adjacent said cylinder portions for securing the bifurcated ends of said spokes with the said pistons.

4. In a wheel, a hub formed with a plurality of radial outwardly extended sockets to provide cylinder portions at said hub, the periphery of said hub being formed with a tapered seat, and an annulus formed to be received on the said tapered seat and to close said sockets.

5. In a wheel, a hub formed with a plurality of radial outwardly extended sockets to provide cylinder portions at said hub, the periphery of said hub being formed with a tapered seat, an annulus formed to be received on the said tapered seat and to close said sockets, pistons within said sockets, and resilient means interposed between said pistons and the said annulus.

6. In a wheel, a hub formed with a plurality of radial outwardly extended sockets to provide cylinder portions at said hub, the periphery of said hub being formed with a tapered seat, an annulus formed to be received on the said tapered seat and to close said sockets, and oil ducts formed in said annulus for directing oil to said sockets.

7. In a wheel, a hub formed with a plurality of radial outwardly extended sockets to provide cylinder portions at said hub, the periphery of said hub being formed with a tapered seat, an annulus formed to be received on the said tapered seat and to close said sockets, and oil ducts formed in said hub and said annulus for directing any oil received therein to said sockets.

In testimony whereof, I have signed my name to this specification.

STEVE BULLUM.